United States Patent [19]
Kamise et al.

[11] Patent Number: 4,856,481
[45] Date of Patent: Aug. 15, 1989

[54] ENGINE KNOCKING CONTROL UNIT

[75] Inventors: Katsuya Kamise; Shigeru Yamamoto, both of Hiroshima; Tetsushi Hosokai, Kure; Koji Miyamoto, Higashihiroshima, all of Japan

[73] Assignee: Mazda Motor Corporation, Hiroshima, Japan

[21] Appl. No.: 183,712

[22] Filed: Apr. 19, 1988

[30] Foreign Application Priority Data

Apr. 20, 1987 [JP] Japan .................................. 62-96938
Apr. 20, 1987 [JP] Japan .................................. 62-96939

[51] Int. Cl.⁴ .............................................. F02D 43/00
[52] U.S. Cl. .................................... 123/425; 123/421; 123/435; 60/602
[58] Field of Search ............... 123/425, 421, 435, 564; 60/602, 600

[56] References Cited

U.S. PATENT DOCUMENTS

| | | | |
|---|---|---|---|
| 4,197,711 | 4/1980 | Fuhrmann et al. | 60/602 |
| 4,387,571 | 6/1983 | Katsumata et al. | 60/602 |
| 4,433,654 | 2/1984 | Yokooku | 123/425 |
| 4,458,646 | 7/1984 | Suzuki et al. | 123/425 |
| 4,485,626 | 12/1984 | Moriguchi et al. | 123/425 |
| 4,509,331 | 4/1985 | Hirabayashi | 123/425 |
| 4,612,900 | 9/1986 | Iwata et al. | 123/425 |

FOREIGN PATENT DOCUMENTS

| | | |
|---|---|---|
| 58-167881 | 10/1983 | Japan . |
| 59-168271 | 9/1984 | Japan .................................. 123/425 |
| 60-62664 | 4/1985 | Japan .................................. 123/425 |
| 60-75730 | 4/1985 | Japan . |
| 60-18831 | 5/1985 | Japan . |
| 61-16239 | 1/1986 | Japan . |

Primary Examiner—Andrew M. Dolinar
Attorney, Agent, or Firm—Lynn L. Augspurger

[57] ABSTRACT

A unit for suppressing knocking in a gasoline engine includes a knocking sensor for sensing knocking and outputting a signal indicative thereof, engine control means for controlling the operating condition of the engine, control variable correcting means responsive to the output from the knocking sensor for correcting a control variable in the engine control means in such a manner that knocking will be suppressed, an engine temperature sensor for sensing engine temperature and determining whether the engine is cold or hot, and correction amount modifying means which, if the engine is cold, modifies the extent to which the control variable is corrected to suppress knocking in such a manner that the amount of correction is made smaller than that which prevails when the engine is hot.

24 Claims, 13 Drawing Sheets

ENGINE KNOCKING CONTROL UNIT

BACKGROUND OF THE INVENTION

This invention relates to improvements in an engine knocking control unit, and more particularly, to an engine knocking control unit adapted to prevent erroneous control when an engine is cold.

The art disclosed in the specification of Japanese Patent Application Laid-Open (KOKAI) No. 60-75730 is an example of a conventional engine knocking control unit. In accordance with this prior art, a knocking control unit includes knocking sensing means for sensing engine knocking, and correcting means which receives an output from the knocking sensing means for correcting an engine control variable, such as the ignition timing of the fuel mixture, in a direction that will suppress knocking when knocking occurs. (More specifically, this entails retarding ignition timing.) This conventional unit suppresses knocking effectively to assure engine durability.

In a case where the control variable is constituted by e.g. ignition timing for igniting a fuel mixture, correcting the ignition timing by retarding the same is accompanied by a change in the state of the combustion of the mixture. Ordinarily, therefore, it is required that a maximum allowable amount of correction be preset. If the amount of correction of ignition timing exceeds the preset maximum amount when knocking occurs, the amount of correction is limited to the preset maximum amount. In this way it is assured that the mixture combustion state will be a minimum allowable boundary state.

However, in the aforementioned prior art, the amount of correction applied to the control variable suddenly reaches the set maximum correction amount when the engine is cold and, hence, there is a decline in the combustibility of the mixture. The problem that results is an abrupt decline in engine output The inventors have carried out extensive research into the causes of the aforementioned drop in engine output. As a result of such research, it has been clarified that since piston-cylinder clearance is comparatively large when the engine is cold, the pistons develop excessive play in their cylinders and the peripheral surface of each piston strikes the wall surface of its cylinder strongly when combustion occurs. It has been found that the noise produced by this phenomenon is erroneously detected as engine knocking and, as a result, when the engine is cold, the aforementioned amount of correction suddenly reaches the maximum value based on this erroneously detected knocking and invites a decline in engine output, as mentioned above.

Accordingly, in an effort to suppress this drop in output when the engine is cold, it has been comtemplated to forcibly halt knocking control at such time. However, knocking can occur even with a cold engine. Consequently, if knocking control were to be suspended when the engine is cold even though knocking is actually occurring, piston damage and burnout would result particularly when the engine is running under a high load, as when intake air is supercharged by an exhaust turbosupercharger or the like. Thus, the expedient of forcibly halting knocking control when the engine is cold is disadvantageous in that engine durability would suffer.

SUMMARY OF THE INVENTION

An object of the present invention is to provide an engine knocking control unit in which knocking control is executed in appropriate fashion to suppress knocking effectively irrespective of whether the engine is hot or cold, thereby improving engine durability and reliability.

Another object of the invention is to provide an engine knocking control unit in which (a) in a case where noise is produced by the pistons striking their cylinders when the engine is cold, the amount of correction applied to the engine control variable is made a small value to effectively suppress an abrupt drop in engine output if there is a high probability that knocking due to the noise will be detected erroneously because of the fact that erroneous detection of knocking caused by the piston noise is allowed as being unavoidable and, as a result, the maximum value of the amount of correction applied to the engine control variable is made smaller than that which prevails when the engine is cold, and (b) if there is a high probability that knocking is actually occurring, the engine control variable is controlled in a direction to suppress such knocking as much as possible, thereby effectively reducing knocking and improving engine durability and reliability.

Still another object of the invention is to provide an engine knocking control unit in which (a) in a case where noise is produced by the pistons striking their cylinders when the engine is cold, the amount of correction applied to the engine control variable is made a small value to effectively suppress an abrupt drop in engine output if there is a high probability that knocking due to the noise will be detected erroneously because of the fact that erroneous detection of knocking caused by the piston noise is allowed as being unavoidable and, as a result, knocking detection sensitivity is set to to be too sensitive, and (b) if there is a high probability that knocking is actually occurring, the engine control variable is controlled in a direction to suppress such knocking as much as possible, thereby effectively reducing knocking and improving engine durability and reliability A further object of the invention is to provide an engine knocking control unit in which, in a case where noise is produced by the pistons striking their cylinders when the engine is cold, the engine control variable is made to correspond to the octane number of the fuel used, after the engine is hot, in order to effectively prevent a drop in engine output when the high-octane fuel is used, even if knocking caused by the piston noise is allowed as being unavoidable and as a result, the engine control variable is forcibly reset to a value corresponding to a high octane number after the engine is hot, thereby erroneously setting the control variable to a value corresponding to a low octane number when the engine is cold.

According to the present invention, the foregoing objects are attained by providing a knocking control unit for controlling knocking, which occurs in a gasoline engine, in a direction that will suppress such knocking, which unit comprises: knocking sensing means for sensing knocking and outputting a signal indicative thereof; engine control means for controlling the operating state of the engine; control variable correcting means which receives the output from the knocking sensing means for correcting a control variable in the engine control means in a direction that will suppress knocking when knocking occurs; engine temperature sensing means for sensing engine temperature and determining whether the engine is in a cold state or hot state; and correction amount modifying means which, if the engine is determined to be in the cold state by the engine temperature sensing means, modifies the amount by which the control variable is corrected in the direction that will suppress knocking in such a manner that said amount is made smaller than that which prevails when the engine is in the hot state According to another aspect of the present invention, the correction amount modifying means includes maximum correction amount limiting means which, if an amount of correction decided by the control variable correcting means is about to exceed a preset maximum correction amount, is operative to limit the amount of correction to the maximum correction amount. If the engine is determined to be in the cold state, the correction amount modifying means limits the maximum correction amount, which has been set by the maximum correction amount limiting means, to a value smaller than that which prevails when the engine is in the hot state.

According to still another aspect of the present invention, the maximum correction amount limiting means includes includes a switching valve mounted in an exhaust passageway of the engine for reducing exhaust pressure acting upon a supercharger, pressure diaphragm means connected to the switching valve for controlling the switching thereof, and a duty solenoid valve for numerically controlling, in response to changing of a duty value, pressure upstream of the supercharger in an intake passageway, which pressure acts upon the pressure diaphragm. By setting the duty value to 100%, the pressure acting upon the pressure diaphragm is set to a low value, thereby setting the maximum supercharge pressure high. By setting the duty value to 0%, on the other hand, the pressure acting upon the pressure diaphragm is set high, thereby setting the maximum supercharge pressure low. The duty value is changed by a maximum amount of 100% if the engine is sensed to be in the hot state by the engine temperature sensing means, and by a maximum amount of 50% if the engine is sensed to be in the cold state.

According to a further aspect of the present invention, if the engine is determined to be in the cold state by the engine temperature sensing means, the correction amount modifying means modifies the sensing sensitivity of the knocking sensing means to be higher in comparison with that which prevails when the engine is in the hot state.

According to a further aspect of the present invention, the knocking sensing means outputs an amount which substantially coincides with a sensed number of knocking signals if the engine is in the hot state, and outputs an amount obtained by reducing the number of knocking signals at a predetermined ratio if the engine is in the cold state.

According to still another aspect of the present invention, the correction amount modifying means modifies the control variable which prevails in the engine control means at occurrence of knocking in a direction that will suppress knocking in dependence upon the amount of the output received from the knocking sensing means.

According to a different aspect of the present invention, the engine control means specifies an ignition timing retarding amount as a control variable for suppressing knocking, and, when the engine is in the cold state, the correction amount modifying means retards the ignition timing by a retarding amount, which is smaller than that which prevails when the engine is in the hot state, in dependence upon the same output from the knocking sensing means.

According to a still different aspect of the present invention, the knocking control unit further comprises resetting means for resetting the control variable, which is corrected by the control variable correcting means in a direction that will suppress knocking, to an initial value when it is sensed by the engine temperature sensing means that the engine has made a transition from the cold state to the hot state.

According to a further aspect of the present invention, the resetting means includes: first resetting means for resetting the control variable, which is corrected by the control variable correcting means in a direction that will suppress knocking, to an initial value when it is sensed that the engine has made a transition from the cold state to the hot state; timekeeping means for counting a predetermined period of time from the moment it is sensed that the engine has made a transition from the cold state to the hot state, the control for suppressing knocking being executed while the predetermined period of time is being counted; and second resetting means for again resetting the control variable, which is corrected by the control variable correcting means in a direction that will suppress knocking, to the initial value at the moment the predetermined period of time is found to elapse by the timekeeping means.

In accordance with the present invention constructed as set forth above, the engine control variable is modified in a direction that will suppress knocking when knocking is sensed by the knocking sensing means. When the engine is cold, piston-cylinder clearance increases and the pistons strike the inner walls of their cylinders more strongly, as a result of which the knocking sensing means mistakenly detects the vibration produced by this striking phenomenon as engine knocking. Consequently, there is the danger that the engine control variable will be modified in the knocking suppression direction based on the erroneous detection, thus causing a drop in engine output unnecessarily. However, in accordance with the invention, the arrangement is such that the modification in the engine control variable in the knocking suppression direction is limited when the engine is cold, in anticipation of the fact that the knocking sensing means will make the erroneous detection when the engine is cold. Therefore, by providing the correction amount modifying means which modifies the amount by which the control variable is corrected in the direction that will suppress knocking when the engine is cold in such a manner that said amount is made smaller than that which prevails when the engine is in the hot state, a decline in engine output caused by erroneous detection of knocking is substantially prevented by the control operation This makes it possible to assure an excellent fuel combustion state.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

One embodiment of an engine knocking control unit according to the present invention will now be described with reference to the drawings.

Figure 1:
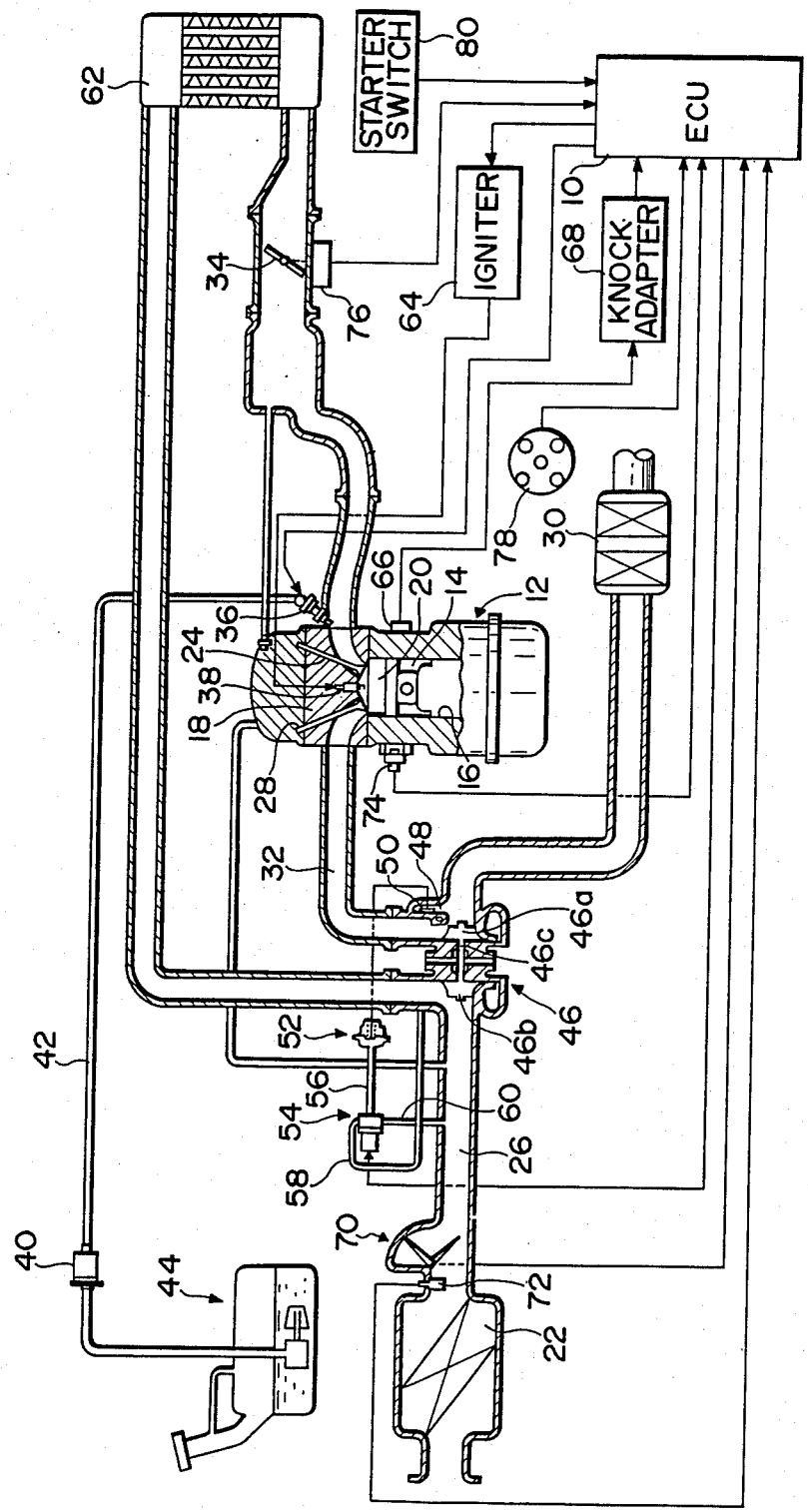
FIG. 1 is a side view schematically illustrating the arrangement of a gasoline engine to which one embodiment of a knocking control unit in accordance with the invention is applied.

FIG. 1 is a schematic view illustrating the overall arrangement of an automobile gasoline engine 12 equipped with a knocking control unit 10 embodying the present invention. The engine 12 is of the type which selectively uses a high-octane number fuel (high-octane gasoline) and a low-octane number fuel (regular gasoline) as fuel. The knocking control unit 10 is well suited for controlling the knocking of engine 12 of the aforementioned type.

As shown in FIG. 1, the engine 12 has e.g. four cylinders 16 slidably accommodating respective pistons 14. Each cylinder 16 has a combustion chamber 20 formed by a space delimited by the inner wall of the cylinder 16, the upper face of the piston 14 and the lower face of a cylinder head 18. Attached to the cylinder 16 is an intake passageway 26 having its one end communicated with the atmosphere via an air cleaner 22 and its other end connected to the combustion chamber 20 via an intake valve 24. The intake passageway 26 is for supplying the combustion chamber 20 with air purified by the air cleaner 22. Also attached to the cylinder 16 is an exhaust passageway 32 having its one end connected to the combustion chamber 20 via an exhaust valve 28 and its other end open to the atmosphere via a catalytic device 30. The exhaust passageway 32 is for discharging exhaust gas produced by burning a mixture in the combustion chamber 20.

Arranged in the intake passageway 26 are a throttle valve 34 for controlling the amount of intake air, and a fuel injection valve 36, which is situated downstream of the throttle valve 34, for injecting fuel into the combustion chamber 20. The catalytic device 30 interposed in the exhaust passageway 32 is for the purpose of scrubbing the exhaust gas. A spark plug 38 of igniting the mixture in the combustion chamber 20 is disposed on the cylinder head 18 defining the upper portion of the combustion chamber 20. A fuel tank 44 is communitatively connected to the fuel injection valve 36 through a fuel supply passageway 42 having a fuel filter 40 interposed in the line. The fuel tank 44 can be selectively supplied with high-octane gasoline or regular gasoline at different times.

An exhaust turbo-supercharger 46 is provided bridging a portion of the intake passageway 26 upstream of the throttle valve 34 and a portion of the exhaust passageway 32 upstream of the catalytic device 30. The turbo-supercharger 46 includes a turbine 46a projecting into the exhaust passageway 32 and driven by exhaust gas, and a compressor 46b coupled unitarily with the turbine 46a via a connecting shaft 46c and interposed in a portion of the intake passageway 26 that is upstream of the throttle valve 34. The compressor 46b is rotatively driven by the turbine 46a, which is rotated by the exhaust gas flow, thereby supercharging the intake air.

A bypass passageway 48 for releasing to the atmosphere the exhaust pressure that acts upon the exhaust turbo-supercharger 46 is provided in a portion of the exhaust passageway 32 near the exhaust turbo-supercharger 46. Arranged in the opening of the bypass passageway 48 is a waste gate valve 50 which opens when the supercharge pressure is greater than a predetermined pressure $P_L$. A pressure diaphragm device 52 for opening and closing the waste gate valve 50 is mechanically connected thereto.

Figure 2:
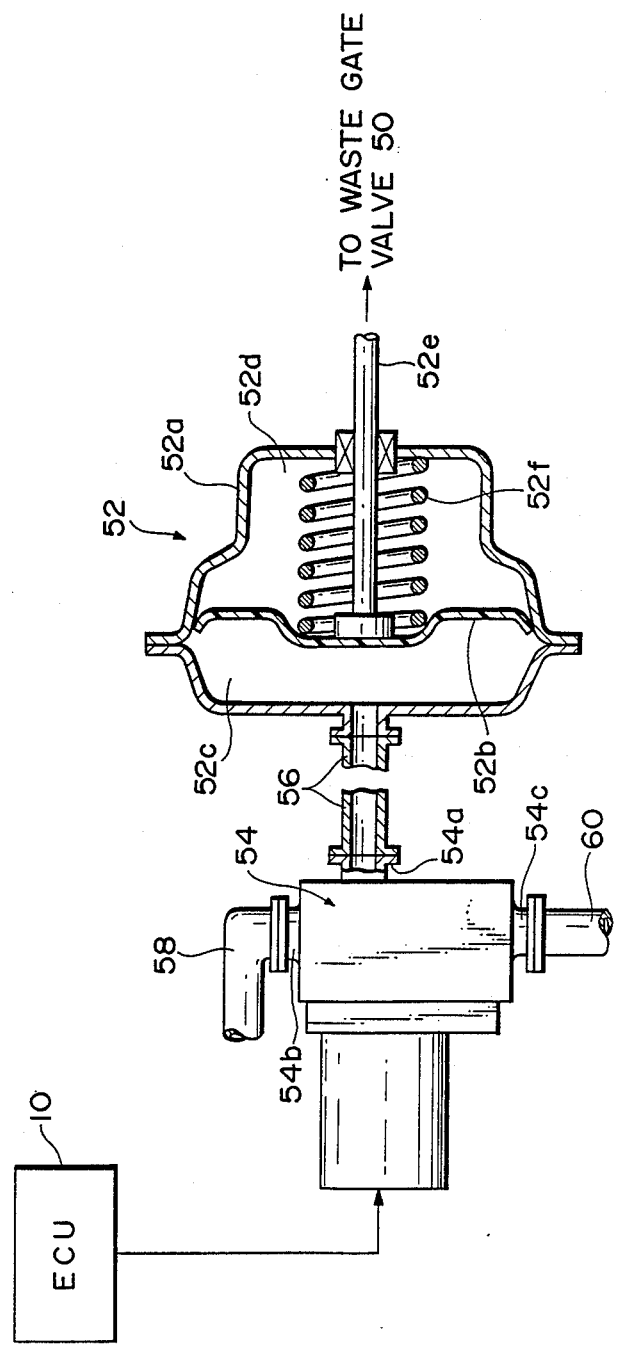
FIG. 2 is a partial sectional view illustrating the construction of a pressure diaphragm unit and its connection to a duty solenoid valve.

As shown in FIG. 2, the pressure diaphragm device 52 includes a hollow housing 52a, a diaphragm 52b arranged so as to partition the interior of the housing 52a, and a pressure cell 52c and spring cell 52d obtained by partitioning the interior of the device 52 into isolated left and right chambers in FIG. 2 by the diaphragm 52b. The diaphragm 52b is mechanically connected to the waste gate valve 50 by a connecting rod 52e. The connection is such that the waste gate valve 50 opens as the diaphragm 52b is biased rightwardly in FIG. 2 (namely in a direction that reduces the size of the spring cell 52d).

A spring 52f is compressed within the spring chamber 52d and urges the diaphragm 52b in a direction that enlarges the spring cell 52d (namely in a direction that closes the waste gate valve 50). In other words, when a predetermined pressure is not acting upon the pressure cell 52c, the waste gate valve 50 is closed on the basis of the biasing force of spring 52f.

A duty solenoid valve 54 has a control port 54a communicatively connected to the pressure cell 52c via a control passageway 56. Supercharge pressure, which is defined by the pressure of the exhaust turbo-supercharger 46 in the portion of the intake passageway 26 downstream of the compressor 46b, is introduced to an intake port 54b of the duty solenoid valve 54 via a pressure passageway 58. Thus, the control port 54a and input port 54b are in complete communication. The duty solenoid valve 54 also has an output port 54c open to the portion of the intake passageway 26 upstream of the compressor 46b via an open passageway 60.

The arrangement is such that if the duty solenoid valve 54 is set to a duty ratio of 0%, the open passageway 60 is completely closed so that the supercharge pressure itself is made to act directly upon the pressure cell 52c of the diaphragm device 52 through the control port 54a and control passageway 56. In accordance with this arrangement, the diaphragm 52b is displaced by the supercharge pressure in a direction to reduce the size of the spring chamber 52d against the biasing force of the spring 52f at the moment the supercharge pressure rises above a first set value $P_L$ of supercharge pressure determined by the biasing force of the spring 52f. The waste gate valve 50 is opened as a result.

If the duty ratio of the solenoid valve 54 is set to 100%, the pressure passageway 58 is communicated over its maximum opening area with the open passageway 60. As a result, the value of the pressure acting upon the pressure cell 52c is reduced via the communication between the control port 54a and output port 54c. Accordingly, the waste gate valve 50 is opened by a second set value $P_H$ of supercharge pressure higher than the first set value $P_L$ of supercharge pressure by an amount corresponding to the decrease in the value of pressure acting upon the pressure cell 52c.

As shown in FIG. 1, an intercooler 62 for cooling air heated by the supercharging action of the exhaust turbo-supercharger 46 is interposed in that portion of the intake passageway 26 which is positioned between the throttle valve 34 and the exhaust turbo-supercharger 46. An igniter 64 is provided in order to adjust the ignition timing of the spark plug 38, namely in order to regulate the retard/advance of the ignition timing.

The knocking control unit 10 characterizing the present invention is defined as part of an engine control unit (hereinafter referred to as an "ECU") for controlling the overall operation of the engine 12. In order to execute knocking control, a knocking sensor 66 serving as means for sensing engine knocking is arranged at the outer periphery of the cylinder 16 of engine 12. The knocking sensor 66 senses, as a knocking signal, vibration having a frequency of 6–8 KHz produced by knocking of the engine 12. The output signal from the knocking sensor 66 is inputted via a knocking adapter 68 to the ECU 10 functioning as the knocking control unit.

Figure 3:
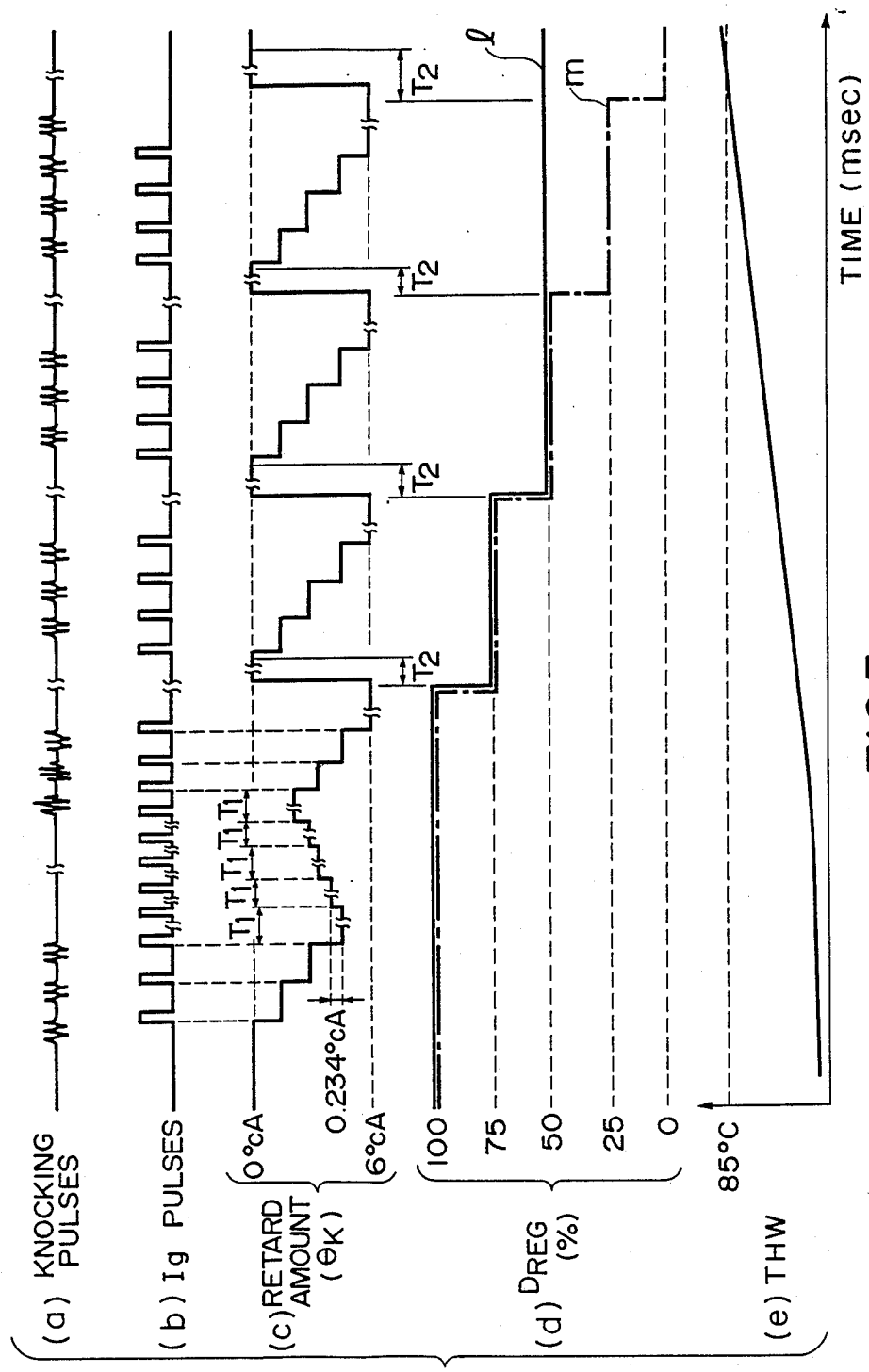
FIG. 3 is a timing chart illustrating the relationship between the degree to which ignition timing is retarded and the degree to which supercharge pressure is controlled when knocking occurs.

The knocking adapter 68 receives the raw signal from the knocking sensor 66, stipulates only those signals that exceed a preset level (threshold level) as knocking signals, extracts the portion of the signal that exceeds the threshold level and delivers this as a knocking signal, shown at (a) in FIG. 3, to the ECU 10.

When the ECU 10 operates as a knocking control unit, as will be described in detail later with reference to a knocking control procedure, the ECU controls the igniter 64, so as to retard ignition timing for the purpose of suppressing knocking, in dependence upon the number of pulses (hereinafter referred to as the "knocking number" $N_N$) in the knocking signal inputted to the ECU by the time the next $I_g$ pulse arrives, as shown at (b) in FIG. 3. The ECU 10 is further adapted to modify the duty ratio of the duty solenoid 54 so as to reduce supercharge pressure, thereby controlling the open/closed state of the waste gate 50.

Various sensors described below are connected to the ECU 10 in order to stipulate the timing and amount at which fuel is injected into the engine 12 by the fuel injection valve 36, and in order to execute knocking control. More specifically, an air flow sensor 70 for measuring an intake air amount Q is arranged immediately downstream of the air cleaner 22, and an intake air temperature sensor 72 for sensing intake air temperature THA is arranged immediately upstream of the air flow sensor 70.

Further, a cooling water temperature sensor 74 is attached to a cooling water feed pipe to serve as means for sensing engine temperature THW by measuring the temperature of the engine cooling water. A throttle opening sensor 76 for sensing throttle opening TVO is connected to the throttle valve 34. A distributor 78 serving as a sensor for sensing engine rotational speed $N_e$ is also provided.

The aforementioned sensor 66–78 are connected to the ECU 10 and the outputs thereof, which are indicative of the quantities sensed, are inputted to the ECU 10. Based on these inputs, the ECU 10 operates and controls the fuel injection valve 36, duty solenoid 54 and igniter 30.

In FIG. 1, numeral 80 denotes a starter switch turned on by the driver when the engine 12 is started.

A knocking control procedure, namely ignition timing retarding control and maximum supercharge pressure control executed by the ECU 10, will now be described in detail with reference to FIGS. 4 through 8.

Figure 4:
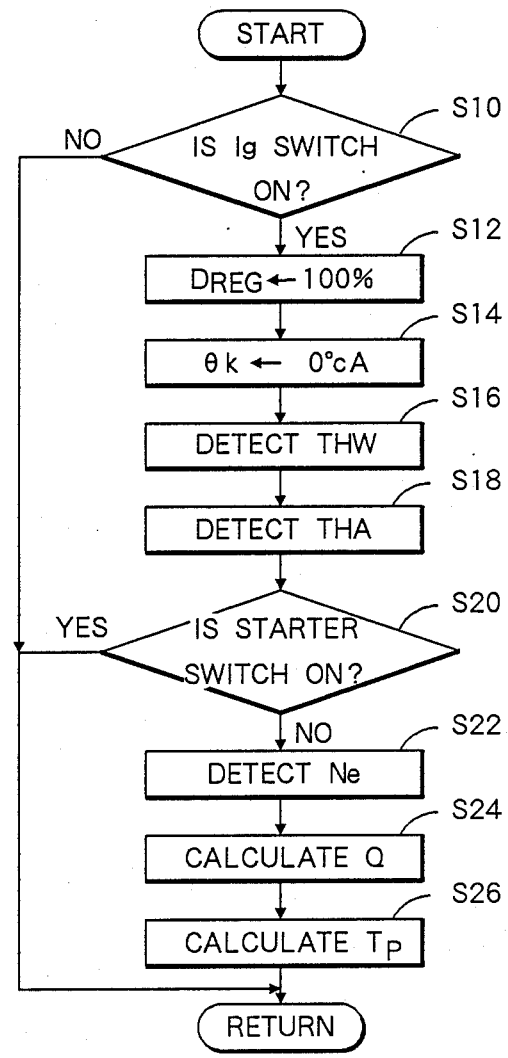
FIG. 4 is a flowchart illustrating a fuel injection amount calculation routine in engine control.

First, a routine for calculating a fuel injection amount $T_p$ described with reference to FIG. 4. The first step of this routine is a step S10, at which it is determined whether electric power has been introduced by turning in an ignition switch (not shown). If the introduction of power is sensed, the program proceeds to a step S12. Here, under the assumption that high-octane gasoline is the fuel used, a duty ratio control value $D_{REG}$, which is output to the duty solenoid valve 54, is set to 100%, which corresponds to high-octane gasoline. As a result, the maximum supercharge pressure of the exhaust turbo-supercharger 46 is initially set to the second set value $P_H$ of supercharge pressure. This is followed by a step S14, at which a retard amount $\theta_K$ for retarding the ignition timing of the spark plug 38 is initially set to a reference value (0°cA), namely a value which results in absolutely no retarding of ignition timing.

Next, the engine cooling water temperature THW is detected through the cooling water temperature sensor 74 at a step S16, and the intake air temperature THA is detected through the intake air temperature sensor 72 at a step S18. This is followed by a step S20, at which it is determined whether the starter switch 80 is ON. If a YES answer is received at the step S20, this means that the engine is being started and, hence, the the control operation is suspended.

If a NO answer is received at the step S20, namely if the starter switch 80 is OFF, meaning that the fuel has exploded in the cylinders of the engine 12, the program proceeds to a step S22, at which the engine rotational speed $N_e$ is detected based on the output of the distributor 78, and then to a step S24, at which the intake air amount Q per revolution of the engine is calculated based on the output of the air flow sensor 70. This is followed by a step S26, at which the amount $T_P$ of fuel injected into the combustion chamber 36 by the fuel injection valve 36 is computed based on the values sensed and calculated at the steps S22, S24, respectively. This computation is executed based on the equation $$T_P = \alpha \times Q/N_e$$

where α is a predetermined correction coefficient.

Thus, amount $T_P$ of fuel injection is computed and the fuel injection valve 36 is driven based on $T_P$. It should be noted that the routine for computing $T_P$ is repeatedly executed every 5 msec.

The knocking control described above is executed with an interrupt at points in time 45°cA before top dead center and bottom dead center, which are determined by a crankangle sensor, not shown.

Figure 5A:
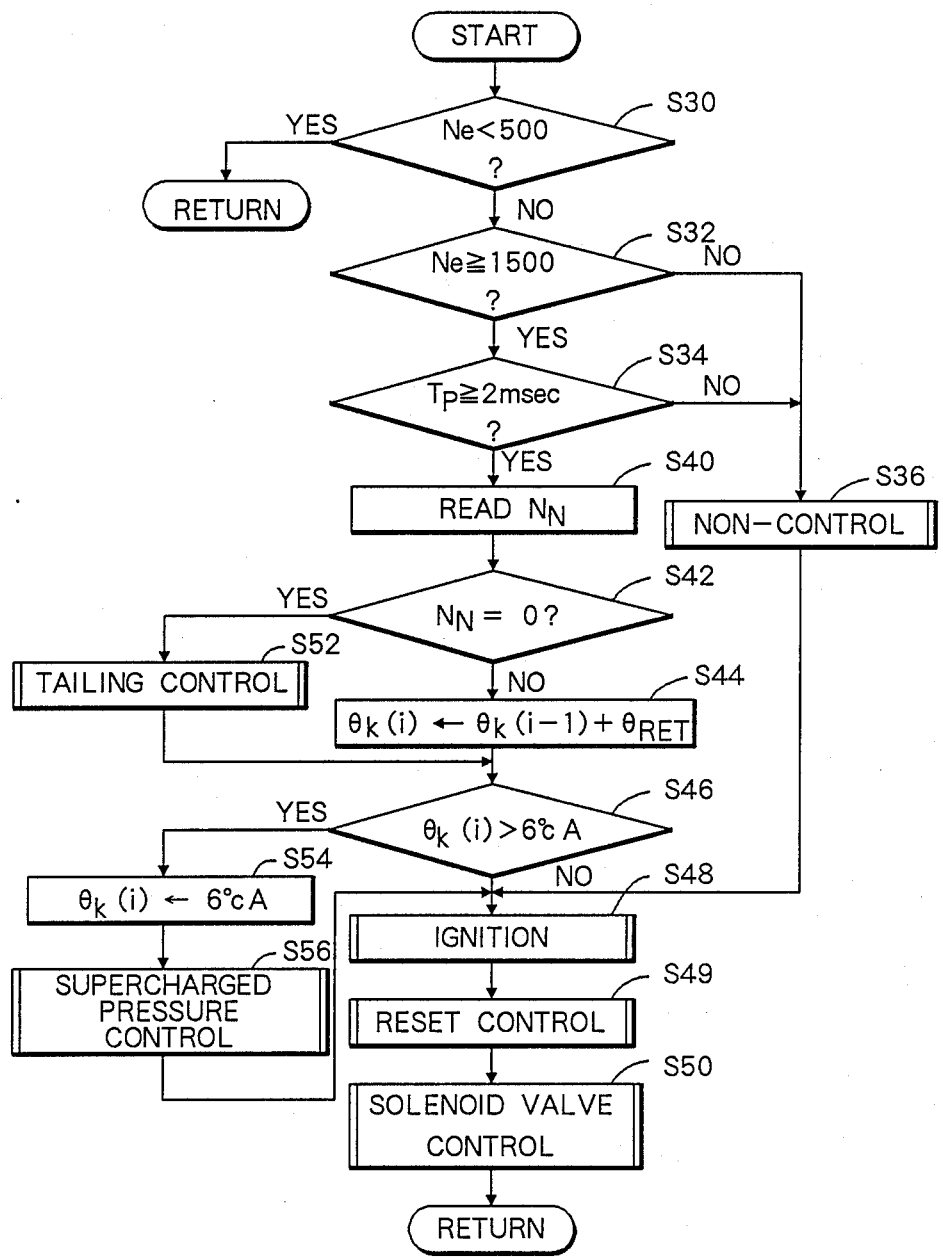
FIG. 5A is a flowchart illustrating a knocking control routine.

In the knocking control routine, a procedure for judging a knocking control area is executed first. Specifically, as shown in FIG. 5A, a first step S30 calls for the engine rotational speen $N_e$ to be compared with an allowable minimum rotational speed, e.g. 500 rpm. If $N_e < 500$ rpm is detected, resulting in YES answer at the step S30, this means that the engine 12 is being started or that the engine 12 has stalled, in response to which the control operation is suspended and the program returns. If a NO answer is received at the step S30, namely if $N_e \geq 500$ rpm holds, it is judged that the engine 12 is being driven in a normal state. Next, in order to determine whether the present operating state of the engine 12 is within a knocking control area, namely an area in which ignition timing control and maximum supercharge pressure control are capable of being carried out, the engine rotational speed $N_e$ is compared with a predetermined set rotational speed, e.g. 1500 rpm, at a step S32, and the fuel injection amount (injection pulse width) $T_P$ is compared with a predetermined set injection amount, e.g. 2 msec, at a step S34.

Further, the knocking number $N_N$ is initialized to zero in every ignition timing.

Figure 7:
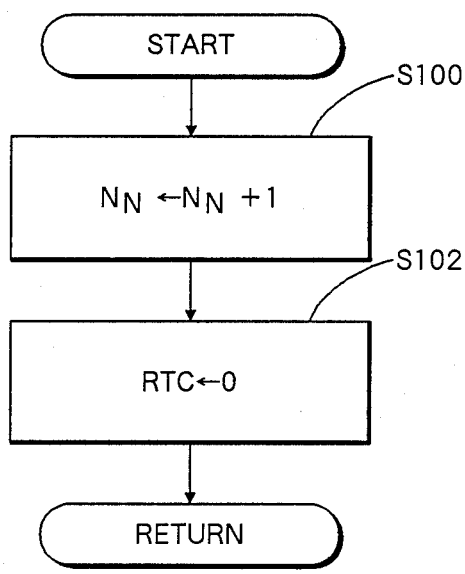
FIG. 7 is a flowchrt illustrating an interrupt routine for knocking number coefficient control.

As shown in FIG. 7, the knocking number counting routine has a first step S100, at which an operation for counting up the knocking number $N_N$ by 1 is executed in a counter (not shown) for counting the knocking number $N_N$. This is followed by a step S102, at which a real-time clock RTC (not shown) is reset to resume timekeeping from zero. It should be noted that the real-time clock RTC is set to keep time in millisecond units. The program returns after the real-time clock RTC is reset.

The arrangement is such that the knocking number $N_N$ incremented at the step S100 is read in at the step S40. Next, it is determined at a step S42 whether the knocking number $N_N$ is zero based on the knocking number $N_N$ read in. If a NO answer is received at the step S42, namely if at least one knocking pulse has entered, this means that knocking has occurred since the last ignition timing instant. As a result, the program proceeds to a step S44, at which a retarding operation, in which a predetermined variable retarding amount $\theta_{RET}$ is added to a retarding amount $\theta_K(i-1)$ that prevailed at the last ignition timing instant, is executed for the purpose of retarding the ignition timing when ignition timing to be executed henceforth is stipulated.

Since the knocking number $N_N$ is proportional to knocking intensity, the variable retarding amount $\theta_{RET}$ is set so as to vary in accordance with the knocking numbers $N_N$, as shown in Table 1 hereinbelow.

TABLE 1

| KNOCKING NUMBER $N_N$ | 2 | 4 | 6 | 8 | 10 | 12 | 14 | 16 | 18 | 20 |
|---|---|---|---|---|---|---|---|---|---|---|
| VARIABLE RETARDING QUANTITY $\theta_{RET}$ (°cA) | 0.938 | 1.875 | 2.813 | 3.759 | 4.688 | 5.625 | 6.094 | ← | ← | ← |

Figure 6:
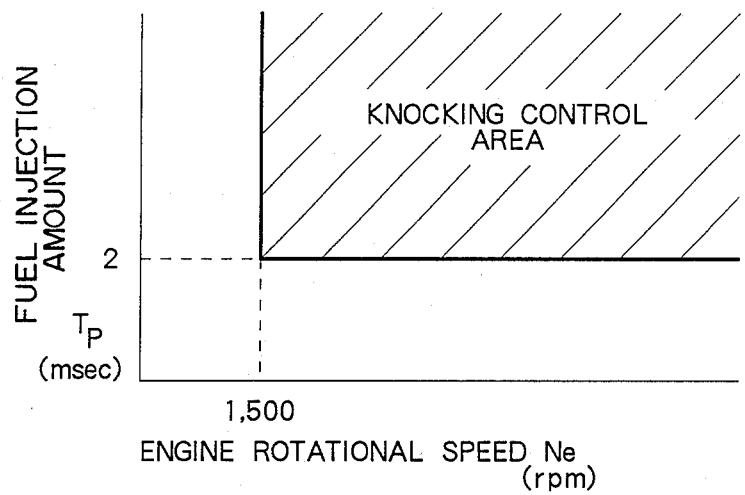
FIG. 6 is a diagram illustrating a knocking control area.

If YES decisions are rendered at both steps S32 and S34, namely if $N_e \geq 1150$ rpm and $T_P \geq 2$ msec hold, the present operating state of the engine lies within a knocking control area, as indicated by the hatched area in FIG. 6. Accordingly, ignition timing control and maximum supercharge pressure control are executed, as will be described below. If a NO decision is rendered at step S32 or S34, namely if $N_e < 1500$ rpm or $T_P 2$ msec holds, the engine operating state does not lie within the knocking control area. As a result, the program proceeds to a step S36, where a non-control operation is executed.

Figure 5B:
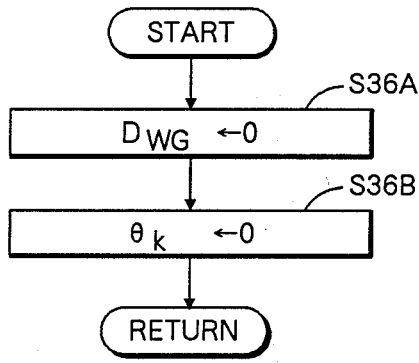
FIG. 5B is a flowchart illustrating a control routine in a non-control area of knocking control.

As shown in FIG. 5B, the non-control operation entails fixing ignition timing and supercharge pressure at predetermined values without controlling them. Specifically, a step S36A calls for a set value $D_{WG}$ of the duty ratio of duty solenoid valve 54 to be made 0%, and the following step S36B calls for the ignition timing retarding amount to be set to zero, after which the program returns.

If it is judged that the present operating state of engine 12 lies within the knocking control area, on the other hand, ignition timing control is executed as the first control procedure for knocking control.

The first step of ignition timing control is a step S40, at which the knocking number $N_N$ is read in. The knocking number $N_N$ is counted in a knocking number counting routine established as a separate interrupt routine.

The knocking number counting routine will now be described with reference to FIG. 7. The counting routine is set to be executed with an interrupt whenever a knocking pulse enters from the knocking adapter 68.

The step S44 is followed by a step S46, which calls for a determination as to whether the ignition timing $\theta_K$ computed at the step S44 is greater than a maximum retarding angle of 6°cA. If a NO decision is rendered at the step S44, namely if the computed ignition timing $\theta_K$ is less than the maximum retarding angle, the program proceeds to a step S48, at which the spark plug 38 is fired at the ignition timing retarded by the retarding amount $\theta_K$ as set forth above.

Thereafter, reset control described in detail below is execute at a step S49. Reset control is executed only when the engine 12 has made a transition from the cold state to the hot state. At the time the transition is made, the duty ratio control value $D_{REG}$ is forcibly reset to 100%, which is the initially set value, and the maximum supercharge pressure is returned to the second set value $P_H$, which is higher than the first set value $P_L$. However, if a transition is not being made from the cold to the hot state, namely if the cold state or hot state persists, the step S49 is not executed. This step is followed by a step S50, at which the opening and closing of the duty solenoid valve 54 is controlled in accordance with the set duty value.

Figure 5C:
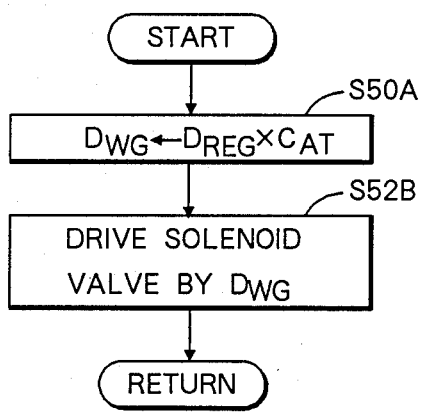
FIG. 5C is a flowchart illustrating a control routine of a duty solenoid valve in knocking control.

As shown in FIG. 5C, control of the duty solenoid valve 54 includes a step S50A, at which the set value $D_{WG}$ of the duty ratio is computed by multiplying the duty ratio control value $D_{REG}$ by a predetermined correction coefficient $C_{AT}$, and a subsequent step S50B, at which the duty solenoid valve 54 is driven based on the set value $D_{WG}$ of the duty ratio thus computed.

Since the set value $D_{WG}$ of the duty ratio is set to zero at the step S36A (FIG. 5B) if the engine is operating in the non-control area, $D_{WG}$ will be set to 0% regardless of the correction coefficient $C_{AT}$, as is obvious from the foregoing discussion. As a result, the supercharge pressure is limited to the first set value $P_L$ for regular gasoline.

On the other hand, if knocking occurs and the ignition timing is retarded over a range that is less than the maximum regarding amount of 6°cA, the control value $D_{REG}$ of the duty ratio is set to 100% by the initial setting operation of step S12. As a result, the supercharge pressure is limited to the second set value $P_H$ for high-octane gasoline. Accordingly, an arithmetic operation in which 100% is multiplied by the correction coefficient $C_{AT}$ is executed at the step S36B.

Figure 8:
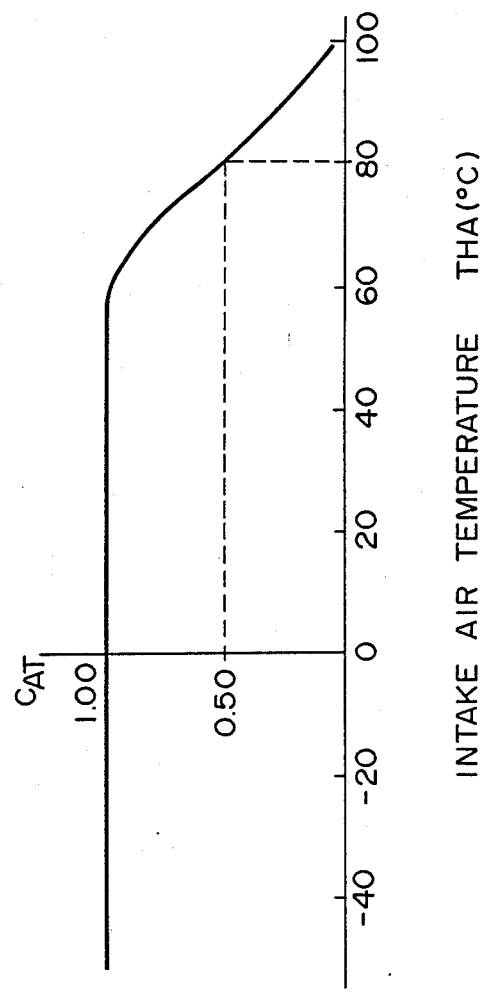
FIG. 8 is a diagram showing the correlation between intake air temperature and a correction coefficient.

As shown in FIG. 8, the correction coefficient $C_{AT}$ varies in dependence upon the intake air temperature THA. More specifically, the correction coefficient $C_{AT}$ gradually decreases with a rise in the intake air temperature THA. Thus, the maximum supercharge pressure is corrected in such a manner that a high intake air temperature is lowered rather than a low intake air temperature. This assures the reliability of the engine 12.

Thus, retarding control of the basic ignition timing and control of the solenoid valve 54 for a case where knocking occurs from the last ignition timing instant end and the program returns.

If a YES decision is rendered at the step S42, namely if knocking has not occurred since the last ignition timing instant, maintaining the ignition timing in the retarded state will cause a drop in engine output. Accordingly, tailing control in which the ignition timing is gradually advanced is executed at a step S52.

Figure 5D:
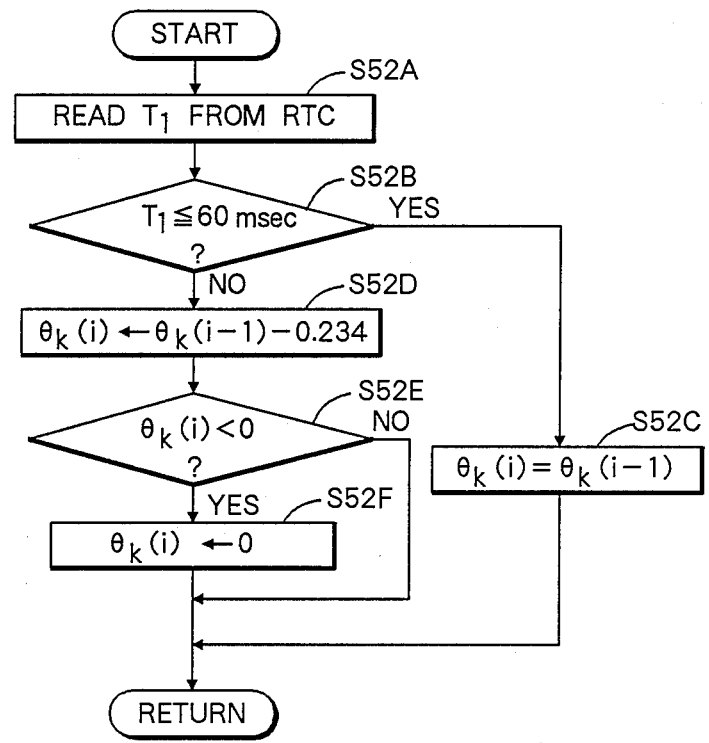
FIG. 5D is a flowchart illustrating an ignition timing trailing control routine in knocking control.

As shown in FIG. 5D, tailing control includes a first step S52A, at which elapsed time $T_1$ from the real-time clock RTC, which is reset at the step S102 by inputting the knocking pulse, is read out. In other words, the read time $T_1$ is the time which has elapsed since the last input of the knocking pulse. Next, it is determined at step S52B whether $T_1 \leqq 60$ msec holds. If the answer is YES, meaning that 60 msec has not yet elapsed since the last input of the knocking pulse, the program proceeds to a step S52C, at which the present ignition timing retarding amount $\theta_K(i)$ is set to and held at the last value $\theta_K(i-1)$ in order to prevent erroneous control. The aforementioned step S48 is executed based on this held retarding amount.

If a YES decision is rendered at the step S52B, meaning that 60 msec has passed since the knocking pulses last entered, control for advancing the ignition timing is executed at a step S52D. That is, since a new knocking pulse has not been produced even though 60 msec has elapsed since the last input of a knocking pulse, there is little likelihood of erroneous control, and an effective engine output will be obtained, even if the ignition timing is somewhat advanced. Accordingly, an arithmetic operation is executed, in which a minute value (e.g. 0.234° CA) is subtracted from the last retarding value $\theta_K(i-1)$ to advance the ignition timing correspondingly.

Thereafter, it is determined at a step S52E whether the retarding quantity $\theta_K(i)$ advanced at the step S52D has become a negative value. If the answer received is YES, meaning that the result of the advancing operation performed at the step S52D is a negative value $[\theta_K(i)<0]$, the retarding amount $\theta_K(i)$ is fixed at zero at a step S52F in order to prevent advancing control to a value in excess of a reference value. The program then proceeds to the step S48. If a NO answer is received at the step S52E, namely if the retarding amount $\theta_K(i)$ advanced at the step S52D is greater than zero, the program proceeds to the step S48 with this value being kept as is.

If a YES decision is rendered at the step S46 (FIG. 5A), meaning that the computed ignition timing $\theta_K$ is greater than the maximum retarding amount of 6°Ca, then the retarding amount is fixed at the maximum retarding amount of °Ca at a step S54, after which supercharge pressure correction control is executed as engine control variable correction control at a step S56.

If the ignition timing retarding amount $\theta_K$ is found to be less than the boundary value of 6°cA at the step S46, it is judged that knocking can be suppressed sufficiently by ignition timing control alone, and the duty solenoid valve 54 is controlled at the 100% duty value, which is the initially set value, without correctively controlling the duty ratio set value $D_{WG}$, namely without executing supercharge pressure control. However, if the ignition timing retarding amount exceeds the upper limit of 6°cA and the retarding amount is fixed at this upper limit value of 6°cA in consideration of engine output, it will no longer be possible to suppress knocking solely by retarding ignition timing. As a result, supercharge pressure correction control, described in detail hereinbelow, is executed at the step S56.

Figure 5E:
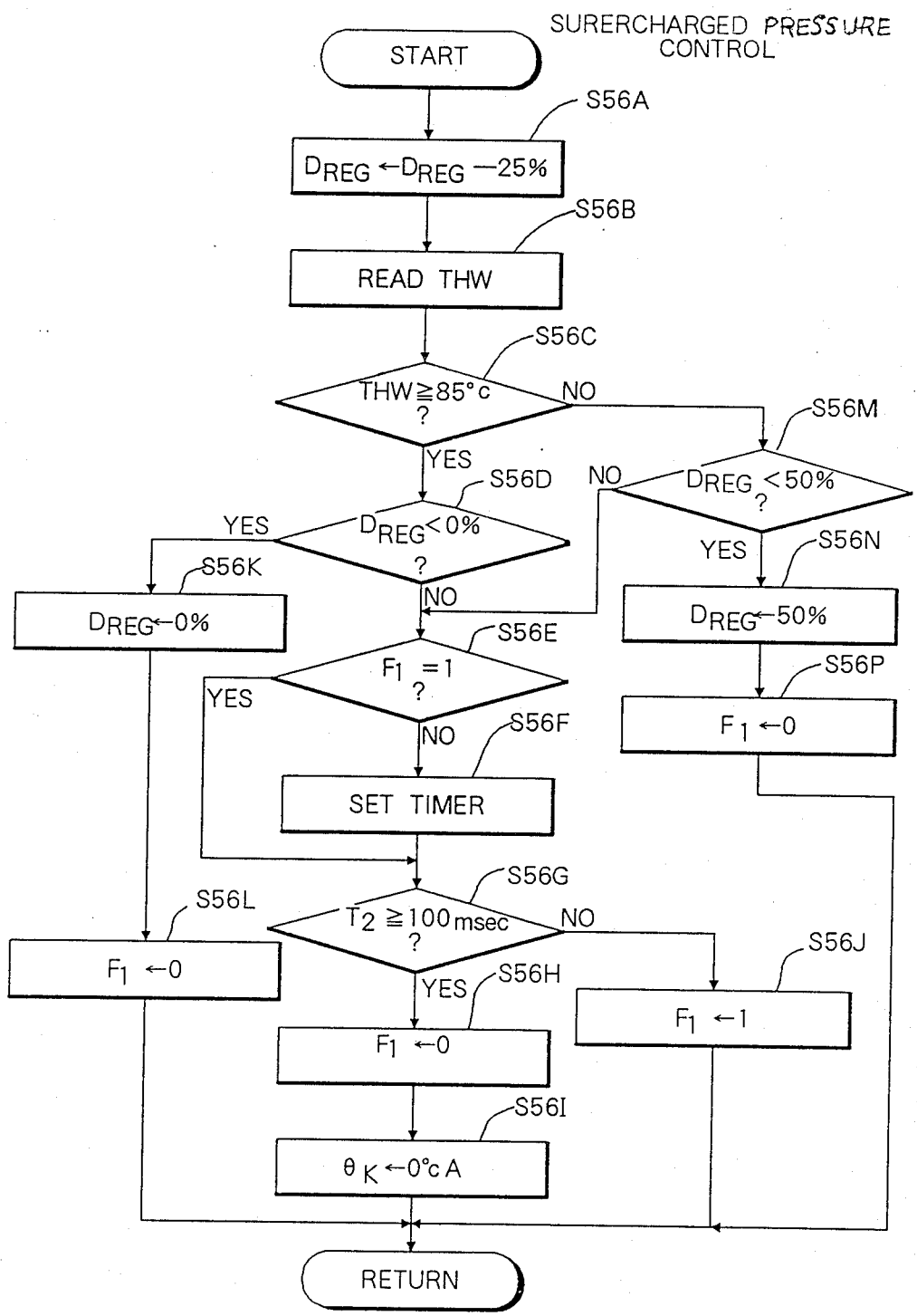
FIG. 5E is a flowchart illustrating a supercharge pressure correction control routine in knocking control.

As shown in FIG. 5E, supercharge pressure correction control includes a first step S56A, at which an arithmetic operation is executed for subtracting 25% from the duty ratio control value $D_{REG}$ of the duty solenoid valve 54. The maximum supercharge pressure value is reduced by an amount corresponding to the amount of reduction performed by this operation, thereby effectively suppressing knocking. Accordingly, the duty ratio control value $D_{REG}$ is set to 100% at the initial setting step. As a result, the supercharge pressure is set to the second set value $P_H$, which is higher than the first set value $P_L$.

After the maximum supercharge pressure value is thus reduced by one step at the step S56A, the present engine cooling water temperature THW is read in at a step S56B. Then, in control described hereinbelow, an operation for lowering supercharge pressure in accordance with the engine cooling water temperature THW is executed. More specifically, after it is decided how many steps the supercharge pressure is to be reduced in accordance with the cooling water temperature THW, control is executed for returning (advancing) the ignition timing to the reference value after a prescribed period of time.

To this end, it is determined at a step S56C whether the cooling water temperature THW sensed by the cooling water temperature sensor 40 is equal to or greater than a predetermined temperature value, e.g. 85° C., corresponding to what the cooling water temperature would be when the engine is hot. If a YES decision is rendered at this step, meaning that the engine 12 is presently in the hot state (i.e. that the engine is in the hot state in an ordinary operating state), the program proceeds to a step S56D, at which it is determined whether the reduced duty ratio control value $D_{REG}$ is a negative value.

If a NO decision is rendered at the step S56D, namely if the reduced duty ratio control value $D_{REG}$ is a positive value (or zero), the duty ratio control value $D_{REG}$ is not modified but is maintained as is in order to actually control the duty solenoid valve 54 on the basis of the reduced duty ratio control value $D_{REG}$. Thus, control is executed in which the maximum supercharge pressure is actually reduced by one step.

Thereafter, if the state in which the duty ratio control value $D_{REG}$ is reduced continues for a predetermined period of time (e.g. 100 msec), control is executed for returning the ignition timing retarding amount $\theta_K$ to zero. That is, a step S56E calls for a determination as to whether a first flag $F_1$, which indicates that a second timer (not shown) for measuring 100 msec of time has started, has been set. Here the first flag $F_1$ will have been reset by the initial setting operation. Accordingly, the first time the determination of step S56E is made, the result will be NO. When the NO answer is received, meaning that the first flag $F_1$ has been reset, the second timer for measuring 100 msec is set at a step S56F.

Next, the time $T_2$ measured by the second timer is read and it is determined whether the predetermined time period of 100 msec has elapsed at a step S56G. If the decision rendered is YES, i.e. if it is determined that 100 msec has elapsed since the duty ratio control value $D_{REG}$ was reduced, then ignition timing can be advanced without problem. Therefore, the first flag $F_1$ is reset at a step S56H, after which the program proceeds to a step S56I. Here the ignition timing retarding amount $\theta_K$ is set at 0°cA. In other words ignition timing is set to a state in which it is not retarded. The program then returns.

If a NO answer is received at the step S56G, that is, if 100 msec has not yet elapsed since the duty ratio control value $D_{REG}$ was reduced, ignition timing advancing control is not executed in order to prevent erroneous control, and the first flag $F_1$ is set at a step S56J, after which the program returns.

If a YES decision is rendered at the step S56D, namely if the control operation for reducing the maximum supercharge pressure value is repeated a plurality of times and it is determined that the duty ratio control value $D_{REG}$ obtained after the last reduction is a negative value, then the duty ratio control value $D_{REG}$ is forcibly fixed at zero at a step S56K. In other words, the maximum supercharge pressure of the exhaust turbo-supercharger 46 is held at the first set supercharge pressure value $P_L$.

Next, the first flag $F_1$ is reset at a step S56L. By resetting the first flag $F_1$, the operation for measuring the time period of 100 msec is essentially suspended. That is, if a NO decision is subsequently rendered at the step S56D, a YES decision will be rendered at the step S56E and the second timer will be started anew at the step S56F.

If a NO answer is received at the step S56C, meaning that the engine cooling water temperature THW is found to be less than 85° C. and indicating that the engine is in the cold state, the gap between the cylinder 16 and the piston 14 will be comparatively large and noise will be produced by the piston 14 strongly striking the cylinder 16. Therefore, it is determined that this state is one in which the striking noise is likely to be mistakenly detected as engine knocking; hence, the following control is executed for the purpose of limiting the reduction in maximum supercharge pressure.

Specifically, a step S56M calls for a determination as to whether the reduced duty ratio control value $D_{REG}$ is less than a predetermined value (e.g. 50%). If a NO decision is rendered at the step S56M, namely if the reduced duty ratio control value $D_{REG}$ is equal to or greater than 50%, it is unnecessary to limit the control value. Therefore, the duty solenoid valve 54 is actually controlled based on the reduced duty ratio control value $D_{REG}$, and control from the step S56E onward is executed for the purpose of lowering the maximum supercharge pressure. At the moment 100 msec elapses following the reduction of the duty ratio control value, the ignition timing retarding value $\theta_K$ is reset to the reference value (0°cA) at the step S56I, as mentioned earlier.

If a YES answer is received at the step S56M, meaning that the duty ratio control value $D_{REG}$ is less than the predetermined value of 50%, then it is judged that the control operation for reducing the supercharge pressure has exceeded the limit. Accordingly, the reduced duty ratio control value $D_{REG}$ is fixed and held at a value of 50% and the maximum supercharge pressure is maintained as is at a step S56N. This is followed by a step S56P, at which the first flag $F_1$ is reset for the same reasons set forth in connection with the step S56L.

In the present embodiment, as described in connection with the knocking control flowcharts of FIGS. 5A through 5E, and as illustrated at (c) in FIG. 3, the output of the knocking sensor 66 is received via the knocking adapter 68. When knocking occurs, knocking suppression is executed solely by retarding ignition timing until the ignition timing retarding amount $\theta_K$ reaches the threshold value (6°cA). Whenever $\theta_K$ attains the threshold value, the duty ratio control value $D_{REG}$ of the duty solenoid valve 54 is decreased from 100% in increments of 25%, as indicated at (d) in FIG. 3, so that the maximum supercharge pressure (engine control variable) of the exhaust turbo-supercharger 46 is corrected in stages from the second set value $P_H$ of supercharge pressure in a direction that will suppress knocking (i.e. in a diminishing direction).

Further, in the present embodiment, when the maximum supercharge pressure value of the exhaust turbo-supercharger 46, or in other words, the extent of the reduction (the amount of correction) in the duty ratio control value $D_{REG}$ of the duty solenoid valve 54 corresponding to the maximum supercharge pressure value, exceeds the preset maximum correction amount (100% of 100% to 0%), the correction amount is limited to 100% of the set maximum correction value, i.e., the duty ratio control value $D_{REG}$ is limited to 0%.

Moreover, as shown at (e) in FIG. 3, when the output THW is received from the cooling water temperature sensor 74 and it is determined that the engine 12 is in the cold state because the temperature of the engine is less than 85° C., which is the criterion for judging the cold/hot state of the engine, the maximum supercharge pressure value of exhaust turbo-supercharger 46 (the duty ratio control value $D_{REG}$ of duty solenoid valve 54) is limited to 50%, as shown by the solid line indicated at l at (d) in FIG. 3, and the set maximum correction value is limited so as to diminish over a range of from 100% to 50%. When the engine is running in the hot state, the set maximum correction amount is reduced over the entire range of from 100% to 0%, as shown by the one-dot chain line indicated at m at (d) in FIG. 3.

Accordingly, in the above-described embodiment, if the knocking number sensed by the knocking sensor 66 increases when the engine is in the hot state, i.e., when the engine cooling water temperature THW is above 85° C., the ignition timing retarding amount $\theta_K$ increases to apply retarding control to the ignition timing, thereby suppressing knocking, as illustrated in FIG. 3. When knocking vanishes, ignition timing is gradually advanced. If knocking should occur again, then the aforementioned control for retarding ignition timing is repeated.

When the retarding amount $\theta_K$ finally reaches the threshold value (6°cA), operation starts out next time with the prevailing duty ratio control value $D_{REG}$ of the duty solenoid valve 54 and with $\theta_K$ held at the threshold value, and then control is exercised to diminish the duty ratio control value $D_{REG}$ 25% at a time. As a result, the maximum supercharge pressure produced by the exhaust turbocharger 46 is reduced from the second set value $P_H$ of supercharge pressure by an amount corresponding to the reduction in the duty ratio control value $D_{REG}$. Also, if knocking does not occur upon elapse of the second time period $T_2$ from the moment this reduction control starts, the control operation for returning the ignition timing to the reference value (retarding amount $\theta = 0$) is repeated, thereby effectively suppressing knocking. Even when the above-described operation is repeated each time knocking occurs and, hence, the duty ratio control value $D_{REG}$ eventually satisifes the relation $D_{REG} < 0$, $D_{REG}$ is limited to zero by the step S56K and the maximum supercharge pressure of the exhaust turbo-supercharger 46 is held at the first set value $P_L$ of supercharge pressure.

When the engine cooling water temperature THW is less than 85° C. and, hence, the engine 12 is in the cold state, the clearance between the piston 14 and cylinder 16 becomes comparatively large and noise is likely to be produced by the piston striking the cylinder. This noise is likely to be mistakenly detected as engine knocking by the knocking sensor 66. Therefore, unless some measures are taken, the duty ratio control value $D_{REG}$ will immediately be limited to zero and the maximum supercharge pressure will sudden fall to the first set value $P_L$ of supercharge pressure. However, in accordance with the invention, the amount of reduction (the correction amount) applied to the duty ratio control value $D_{REG}$ is modified from 100% to 50% when the engine is cold. As a result, the duty ratio control value $D_{REG}$ is forcibly held at a maximum limit of 50%.

Accordingly, the maximum supercharge pressure becomes an intermediate value $(P_H + P_L)/2$, namely a value midway between the second set value $P_H$ of supercharge pressure corresponding to the duty ratio control value $D_{REG}$ of 100% and the first set value $P_L$ of supercharge pressure corresponding to the duty ratio control value $D_{REG}$ of 0%. Thus, the duty ratio control value $D_{REG}$ is no longer reduced to the first set value $P_L$, namely the minimum value, of supercharge pressure. In this way a sudden drop in engine output is prevented as much as possible. Moreover, since the maximum supercharge pressure value is reduced from the second set value $P_H$ to the intermediate value $(P_H + P_L)/2$ even when knocking actually occurs, knocking can be effectively prevented to assure the durability and reliability of the engine 12.

In the foregoing embodiment, once the the duty ratio control value $D_{REG}$, namely the maximum supercharge pressure, is reduced, it is not raised again but is kept at or below this value except when the reset control operation of step S49 is executed. The reason for this is as follows: As mentioned earlier, though the duty ratio control value $D_{REG}$ is set to 100% at the initial setting operation of step S12 on the assumption that the gasoline charged in the fuel tank 44 is high-octane gasoline, knocking occurs quite frequently if the gasoline filling the fuel tank 44 is actually regular gasoline. Accordingly, the need to delay ignition timing or the need to lower supercharge pressure because of frequent knocking signifies that the setting of the duty ratio control value $D_{REG}$ to 100% at the initial setting operation is itself a mistake, and that the gasoline charged in fuel tank 44 is actually regular gasoline. Therefore, as set forth above, the maximum supercharge pressure reduced to the first set value $P_L$ of supercharge pressure corresponding to regular gasoline is held at this value and is not raised.

On the other hand, if high-octane gasoline is actually charged in the fuel tank 44 in a state where the duty ratio control value $D_{REG}$ corresponding to high-octane gasoline has been set to 100% in the initial setting step, then the established conditions match and there will be little possibility of knocking. Accordingly, if knocking should occur when the engine is cold, in all likelihood this will be based on the erroneous detection as set forth above. If the supercharge pressure, once reduced, were to be held in the reduced state without exception, as described above, the following problem would result:

If the initial setting for high-octane gasoline has been made and high-octane gasoline is actually charged in the fuel tank, a situation will arise in which knocking is detected based on an erroneous detection operation. In such case, the duty ratio control value $D_{REG}$ will be diminished to 0% in increments of 25% based on the erroneous detection of knocking. If the duty ratio control value $D_{REG}$ is continuously maintained at 0%, the maximum supercharge pressure of engine 12 will be limited to the first set value $P_L$ for regular gasoline, as mentioned above, regardless of the fact that high-octane gasoline has actually been charged in the fuel tank. As a result, the maximum supercharge pressure will be limited to the first set value $P_L$ for regular gasoline even when the operating state of the engine makes a transition to the hot state and knocking is no longer detected erroneously. In consequence, the output increasing effect obtainable by charging the tank with high-octane gasoline will not be attained, thus rendering use of the high-octane gasoline meaningless.

Accordingly, the design is such that this problem is avoided by temporarily resetting the duty ratio control value $D_{REG}$ to the intially set value of 100% at the step S49 when the engine makes the transition from the cold to the hot state, as described earlier. This resetting control operation of step S49 will now be described in detail with reference to FIG. 5F.

Figure 5F:
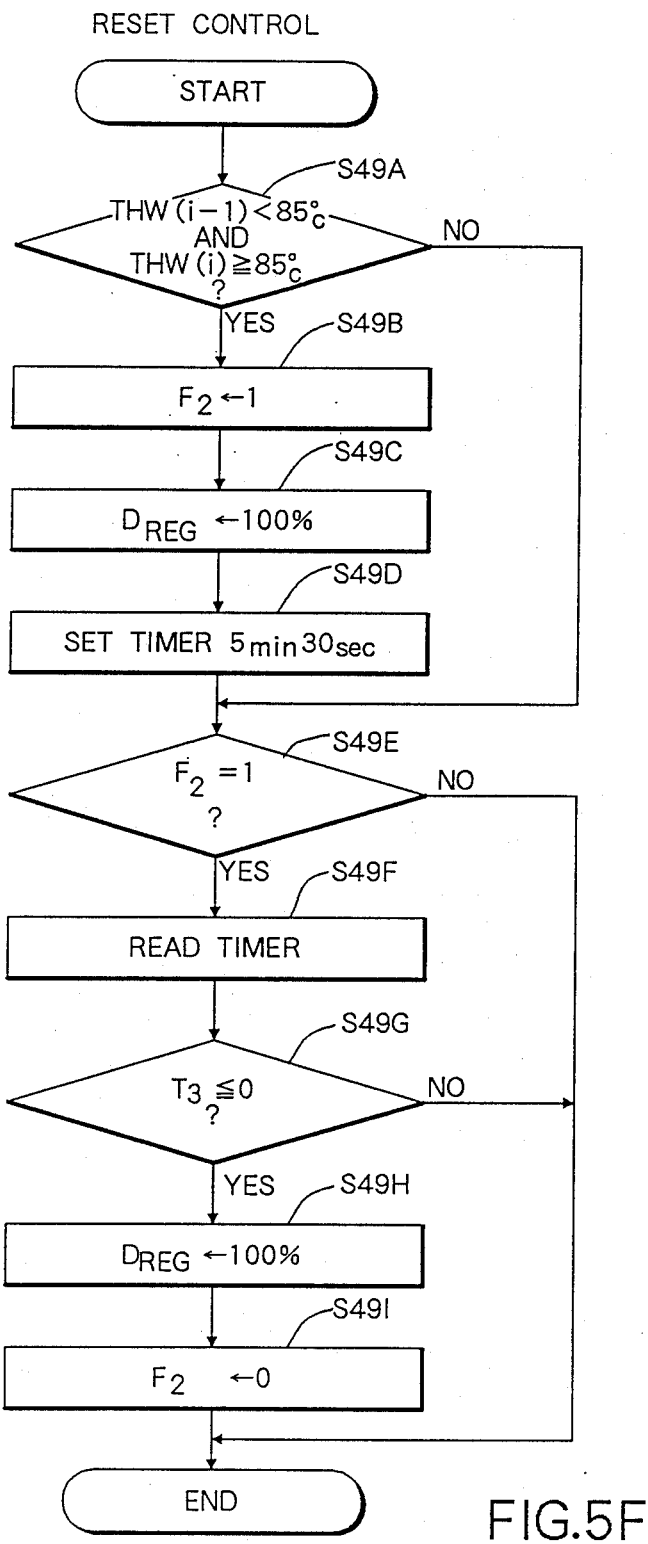
FIG. 5F is a flowchart illustrating a reset control routine in knocking control.

As shown in FIG. 5F, the reset control operation includes a first step S49A, at which it is determined whether the engine 12 has made a transition from the cold to the hot state. The two conditions which must be satisfied for a YES decision are as follows: (1) last sensed cooling water temperature $THW(i-1) < 85°$ C., and (2) presently sensed cooling water temperature $THW(i) \geq 85°$ C.

If a YES answer is received at the step S49A, namely if it is decided that the engine 12 has made the transition from the cold to the hot state, then a second flag $F_2$ indicating that this transition has taken place is set at a step S49B. It should be noted that this flag has been reset in the initial setting operation. Next, the duty ratio control value $D_{REG}$ is reset to 100%, which is the same as the initially set value, at a step S49C. This is followed by a step S49D, at which a third timer (not shown) is set to a predetermined time period of 5 minutes and 30 seconds by an interrupt routine to take into account a fluctuation in the cooling water temperature that accompanies operation of a thermostat arranged in the engine cooling water line. The third timer starts being counted down as soon as it is set.

The program then proceeds to a step S49E, at which it is determined whether the second flag $F_2$ has been set. If a YES answer is received at the step S49E, meaning that the second flag $F_2$ has been set and, hence, that the engine has made the transition from the cold to the hot state, then elapsed time $T_3$ measured by the third timer is read in at a step S49F. Next, it is determined at a step S49G whether the elapsed time $T_3$ has become zero.

If a NO decision is rendered at the step S49G, namely if it is decided that 5 minutes and 30 seconds has not yet elapsed since the transition from the cold to the hot state, the control procedure returns. Accordingly, as described earlier in connection with the step S50, the duty solenoid valve 54 is driven at the duty ratio control value $D_{REG}$ of 100% set at the step S49C, and the maximum supercharge pressure is set to the second set value $P_H$ corresponding to high-octane gasoline. If a YES answer is received at the step S49B, meaning that 5 minutes and 30 seconds has elapsed since the transition from the cold to the hot state, the duty ratio control value $D_{REG}$ is again reset to 100% at a step S49H.

Thereafter, the second flag $F_2$ is reset at a step S49I, and the program returns. The reason for again resetting the duty ratio control value $D_{REG}$ to 100% at step S49H is as follows: If a NO answer is received at the step S49G, the series of knocking control steps shown in FIG. 5A is executed until the aforementioned period of 5 minutes and 30 seconds elapses. If actual knocking is detected in the knocking control operation, a situation will arise in which the duty ratio control value $D_{REG}$ is diminished 25% at a time so that the maximum supercharge pressure is gradually reduced to the second set value $P_H$.

As a result, it develops that even though the duty ratio control value $D_{REG}$ has been reset to 100% beforehand at the step S49C, $D_{REG}$ will be set to a value less than 100% at the instant 5 minutes and 30 seconds of time elapses. This will render meaningless the operation of resetting $D_{REG}$ to 100% at the step S49C. Therefore, the arrangement is such that the control procedure for resetting $D_{REG}$ to 100% again is executed at the step S49H.

If the decision rendered at the step S49A is NO, meaning that the transition from the cold to the hot state has not been made, the program jumps to the step S49E, where it is determined whether the second flag $F_2$ has been set. Since the step S49B will not have been executed in this case, the second flag $F_2$ will still be in the reset state and, as a result, a NO decision is rendered at the step S49E and the program returns. Thus, if the engine 12 is still in the cold or hot state, the reset control operation of step S49 is in effect not executed and the duty solenoid valve 54 is driven in accordance with the duty ratio control value $D_{REG}$ decided earlier.

When the step S49 is executed, the reset control operation is useful in a case where high-octane gasoline has been charged in the fuel tank, as mentioned above. If regular gasoline has been charged, on the other hand, the duty ratio control value $D_{REG}$ is thus forcibly reset to 100%, whereby the maximum supercharge pressure is set to the comparatively high second set value $P_H$. As a result, after the step S49H is executed, knocking will occur frequently since the gasoline will have a low octane number.

Thereafter, by executing the series of knocking control steps, the maximum supercharge pressure will be reduced from the second set value $P_H$ corresponding to high-octane gasoline to the first set value $P_L$ corresponding to regular gasoline. In this state, therefore, the maximum supercharge pressure continues to be held at the first set value $P_L$ corresponding to regular gasoline and effective knocking suppression is achieved.

The present invention is not limited to the arrangement of the above-described embodiment but can be modified in various ways within the scope of the claims.

For example, in the foregoing embodiment, the maximum supercharge pressure value is gradually reduced in stages to the value corresponding to a low octane number (the first set value $P_L$ of supercharge pressure) if controlling the retarding of ignition timing is insufficient. However, knocking control can of course be performed solely by controlling supercharge pressure, and the engine control variable for suppressing knocking can be the ignition timing or the air-fuel ratio of the mixture besides the supercharge pressure. In such case, in accordance with knocking control based on ignition timing, for example, the maximum value (a set maximum control amount) of the ignition timing retarding amount $\theta_K$ would be modified from 6°cA when the engine is hot to 2°cA when the engine is cold.

Further, in the foregoing embodiment, control for varying the maximum supercharge pressure correction amount in dependence upon the hot state/cold state of the engine is designed with 85° C. serving as the boundary value of the engine cooling water temperature THW on the basis of which the hot state/cold state decision is made, with the maximum supercharge pressure correction amount being limited to 50% when the engine is cold and up to 100%, without applying this limitation, when the engine is hot. However, the present invention is not limited to such an arrangement. As indicated hereinbelow, a first modification would be to effect control in such a manner that the variable retarding amount $\theta_{RET}$ conforming to the knocking number $N_N$ is varied in dependence upon the hot state/cold state of the engine when the engine is cold.

Figure 9:
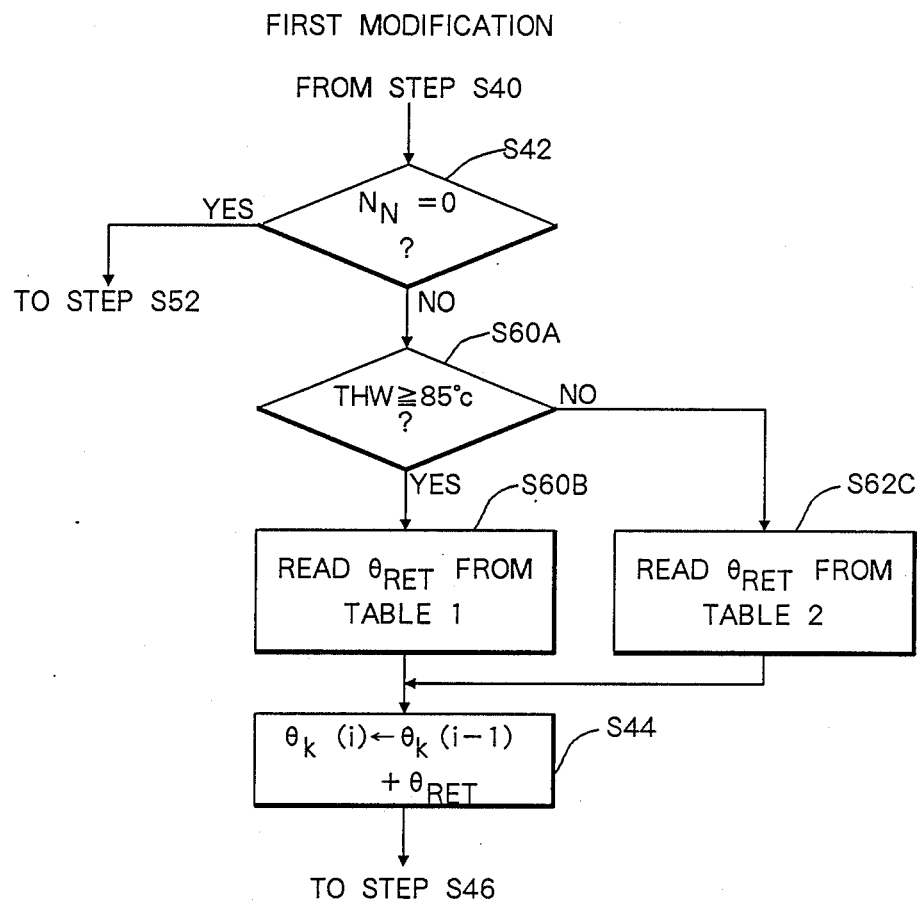
FIG. 9 is a flowchart illustrating the principal part of a control procedure in a first modification of the embodiment of the knocking control unit according to the invention.

Specifically, as shown in FIG. 9 illustrating the control procedure of the first modification, it is determined at the step S42 whether at least one knocking pulse has been counted. If the answer is NO, it is determined at a step S60A whether the engine cooling water temperature THW is equal to or greater than 85° C. If the answer received is YES, namely if the present operating state of the engine 12 is the hot state, then the variable retarding amount $\theta_{RET}$ is decided at a step S60B based on Table 1 given hereinabove.

If a NO answer is received at the step S60A, namely if the present operating state of the engine is the cold state, then the variable retarding amount $\theta_{RET}$ is decided at a step S60C based on the following Table 2:

TABLE 2

| KNOCKING NUMBER $N_N$ | 2 | 4 | 6 | 8 | 10 | 12 | 14 | 16 | 18 | 20 |
|---|---|---|---|---|---|---|---|---|---|---|
| VARIABLE RETARDING QUANTITY $\theta_{RET}$ (°CA) | 0.469 | 0.937 | 1.406 | 1.879 | 2.344 | 2.812 | 3.047 | ← | ← | ← |

In this first modification arranged as set forth above, the hot state/cold state judgment is not made based on the setting of the duty ratio control value $D_{REG}$. Instead, the decision is made in accordance with the decision regarding the variable regarding amount $\theta_{RET}$ when setting the retarding amount $\theta_K$ of ignition timing. As a result, the judgment is made in a state where the four steps S56C, S56M, S56N and S56P are removed from the control procedure of FIG. 5E.

In the first modification as described in detail hereinabove, the control variable, which differs depending upon whether the engine 12 is hot or cold, is made the variable retarding amount $\Theta_{RET}$, and the variable retarding amount $\theta_{RET}$ when the engine is cold is set to be smaller than when the engine is hot. As a result, even if the knocking number $N_N$ which is inputted when the engine is cold is the same as that when the engine is hot, the ignition timing retarding amount $\theta_K$ based on knocking is set small. Thus, the retarding amount $\theta_K$ reacts more sensitively to knocking when the engine cold than when the engine is hot.

Accordingly, though the noise produced by the piston 14 striking the cylinder 16 when the engine 12 is in the cold state is likely to be erroneously detected by the knocking sensor 66, in this embodiment the ignition timing retarding amount $\theta_K$ is modified to a small value when the engine is cold. As a result, the ignition timing does not readily attain the maximum retarding amount of 6°cA even if knocking is detected.

A sudden drop in engine output is thus prevented as much as possible. Moreover, since ignition timing retarding control is executed when knocking actually occurs, knocking can be effectively prevented to assure the durability and reliability of the engine 12.

Figure 10:
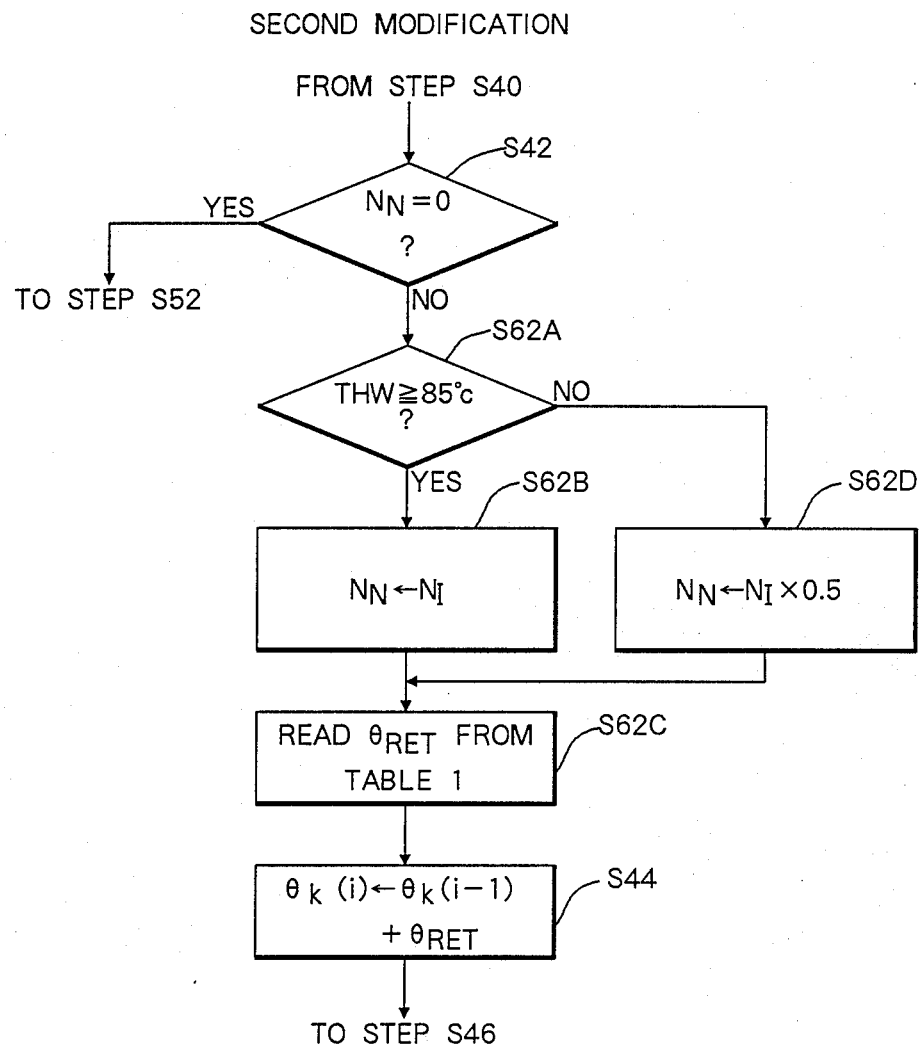
FIG. 10 is a flowchart illustrating the principal part of a control procedure in a second modification of the embodiment of the knocking control unit according to the invention.

Furthermore, in the first modification, the setting of knocking suppression control for dealing with knocking when the engine is cold to be more insensitive in comparison with when the engine is hot is implemented by setting the variable retarding amount $\theta_{RET}$ to a value smaller when the engine is cold than when the engine is hot. However, the invention is not limited to this modification. For example, as illustrated in FIG. 10 showing a second modification, the same effects can be obtained by setting the counting of the knocking number accompanying the input of the knocking pulses to be more insensitive when the engine is cold than when it is hot.

More specifically, the arrangement is such that if it is determined at a step S62A that the engine is operating in the hot state, then the relationship between a knocking pulse input number $N_I$ and the knocking number $N_N$ are set to be the same (i.e. 1:1) at a step S62B. This is followed by a step S62C, at which the variable retarding amount $\theta_{RET}$ is read in from the Table 1 on the basis of the knocking number $N_N$ set at the step S62B. If the engine is determined to be operating in the cold state at the step S62A, then half the knocking pulse input number $N_I$ is set as the knocking number $N_N$ at a step S62D. Thus, the same effects can be obtained even if the arrangement is such that knocking is detected with greater insensitivity when the engine is cold than when the engine is hot.

Thus, in accordance with the knocking control unit of the embodiment as described above, a correction amount is applied to an engine control variable to suppress engine knocking when such knocking occurs, and the set maximum correction amount when the engine is hot is modified to be smaller when the engine is cold. Therefore, even if knocking is mistakenly detected because of noise when the engine is cold, attendant overcorrection of the engine control variable is prevented so that an unnecessary drop in engine output can be avoided. In addition, when knocking actually occurs, knocking can be suppressed in an effective manner. This makes it possible to improve engine durability and reliability.

What is claimed is:

1. An engine knocking control unit for controlling knocking, which occurs in a gasoline engine, in a direction that will suppress such knocking, said unit comprising:
    knocking sensing means for sensing knocking and outputting a signal indicative thereof;
    engine control means for controlling the operating condition of the engine;
    control variable correcting means which receives the output from said knocking sensing means, for correcting a control variable in said engine control means in a direction that will suppress knocking when knocking occurs;
    engine temperature sensing means for sensing engine temperature and determining whether the engine is in a cold state or hot state; and
    correction amount modifying means which, if the engine is determined to be in the cold state by said engine temperature sensing means, modifies the amount by which the control variable is corrected in the direction that will suppress knocking in such a manner that said amount is made smaller than that which prevails when the engine is in the hot state.

2. The unit according to claim 1,
    wherein said correction amount modifying means includes maximum correction amount limiting means which, if an amount of correction decided by said control variable correcting means is about to exceed a preset maximum correction amount, is operative to limit the amount of correction to said maximum correction amount, and
    wherein said correction amount modifying means limits, if the engine is determined to be in the cold state, the maximum correction amount, which has been set by said maximum correction amount limiting means, to a value smaller than that which prevails when the engine is in the hot state.

3. The unit according to claim 2,
    wherein said correction amount modifying means is adapted to continuously maintain the limited maximum correction amount.

4. The unit according to claim 3,
    wherein said control variable correcting means has, as control variables for correcting knocking in the direction that will suppress knocking, a first variable continuously maintained in a limited state, and a second variable returned to an initial value in a state where knocking is undetected, and
    wherein said correction amount modifying means is adapted to modify said first variable, if the engine is determined to be in the cold state, in such a manner that the amount of correction for suppressing knocking is made smaller than that which prevails when the engine is in the hot state.

5. The unit according to claim 4,
    wherein said first variable is supercharge pressure in a supercharge connected to the engine, and
    said second variable is an ignition timing retarding amount of the engine.

6. The unit according to claim 5,
    wherein a maximum set pressure of said supercharge pressure varies in dependence upon the operating condition of the engine between a first set pressure and a second set pressure set higher than set first set pressure, and said maximum correction amount limiting means stipulates the maximum correction amount as a difference between the first set pressure and the second set pressure when the engine is in the hot state, and stipulates the maximum correction amount as a value smaller than a difference between the first set pressure and the second set pressure when the engine is in the cold state.

7. The unit according to claim 6, wherein said maximum correction amount limiting means stipulates the maximum correction amount by a difference between the second set pressure and a third set pressure, which is situated between the first set pressure and the second set pressure.

8. The unit according to claim 6, wherein said first set pressure is set to correspond to a low-octane number fuel, and said second set pressure is set to correspond to a high-octane number fuel.

9. The unit according to claim 8, wherein said engine control means sets a maximum value of supercharge pressure to the second set value in an initial setting operation.

10. The unit according to claim 6, wherein said maximum correction amount limiting means includes:

a switching valve for reducing the supercharge pressure produced by said supercharger;

pressure diaphragm means connected to said switching valve for controlling switching thereof; and a duty solenoid valve for numerically controlling, in response to changing of a duty value, pressure downstream of said supercharge in an intake passageway, which pressure acts upon said pressure diaphragm;

the pressure acting upon said pressure diaphragm being set low, thereby setting maximum supercharge pressure high, by setting the duty value to 100%, and the pressure acting upon said pressure diaphragm being set high, thereby setting the maximum supercharge pressure low, by setting the duty value to 0%;

said duty value being changed by a maximum amount of 100% if the engine is sensed to be in the hot state by said engine temperature sensing means, and by a maximum amount of 50% if the engine is sensed to be in the cold state by said engine temperature sensing means.

11. The unit according to claim 10, wherein maximum supercharge pressure achieved by setting said duty value to 100% is set to correspond to high-octane number fuel, and maximum supercharge pressure achieved by setting said duty value to 0% is set to correspond to low-octane number fuel.

12. The unit according to claim 1, wherein said correction amount modifying means modifies, if the engine is determined to be in the cold state by said engine temperature sensing means, the sensing sensitivity of said knocking sensing means to be higher in comparison with that which prevails when the engine is in the hot state.

13. The unit according to claim 12, wherein said knocking sensing means outputs an amount which substantially coincides with a sensed number of knocking signals if the engine is in the hot state, and outputs an amount obtained by reducing the number of knocking signals at a predetermined ratio if the engine is in the cold state.

14. The unit according to claim 13, wherein said correction amount modifying means modifies the control variable, which prevails in said engine control means at occurrence of knocking, in a direction that will suppress knocking in dependence upon the amount of the output received from said knocking sensing means.

15. The unit according to claim 14, wherein the control variable in said engine control means is an ignition timing retarding amount.

16. The unit according to claim 12, wherein said engine control means specifies an ignition timing retarding amount as a control variable for suppressing knocking, and, said correction amount modifying means retards, when the engine is in the cold state, the ignition timing by a retarding amount, which is smaller than that which prevails when the engine is in the hot state, in dependence upon the same output from the knocking sensing means.

17. An engine knocking control unit for controlling knocking, which occurs in a gasoline engine, in a direction that will suppress such knocking, said unit comprising:

knocking sensing means for sensing knocking and outputting a signal indicative thereof;

engine control means for controlling the operating condition of the engine;

control variable correcting means which receives the output from said knocking sensing means for correcting a control variable in said engine control means in a direction that will suppress knocking when knocking occurs;

engine temperature sensing means for sensing engine temperature and determining whether the engine is in a cold state or hot state; and resetting means for resetting the control variable, which is corrected by said control variable correcting means in a direction that will suppress knocking, to an initial value when it is sensed by said engine temperature sensing means that the engine has made a transition from the cold state to the hot state.

18. The unit according to claim 17, wherein said control variable correcting means has, as control variables for correcting knocking in the direction that will suppress knocking, a first variable continuously maintained in a limited state.

19. The unit according to claim 18, wherein said control variable correcting means further has a second variable returned to an initial value in a state where knocking is undetected, and wherein said first variable is reset by said resetting means.

20. The unit according to claim 19, wherein said first variable is supercharge pressure in a supercharger connected to the engine, and said second variable is an ignition timing retarding amount of the engine.

21. The unit according to claim 20, wherein said first variable includes a modified pressure set to correspond to a low-octane number fuel, and an initial pressure set to correspond to a high-octane number fuel.

22. The unit according to claim 20,
which further comprises:
a switching valve for reducing supercharge pressure produced by said supercharger;
pressure diaphragm means connected to said switching valve for controlling switching thereof, and
a duty solenoid valve for numerically controlling, in response to changing of a duty value, pressure douwnstream of said supercharge in an intake passageway, which pressure acts upon said pressure diaphragm;
the pressure acting upon said pressure diaphragm being set low, thereby setting maximum supercharge pressure high, by setting the duty value to 100%, the pressure acting upon said pressure diaphragm being set high, thereby setting the maximum supercharge pressure low, by setting the duty value to 0%.

23. The unit according to claim 22,
wherein maximum supercharge pressure achieved by setting said duty value to 100% is set to correspond to high-octane fuel, and maximum supercharge pressure achieved by setting said duty value to 0% is set to correspond to low-octane fuel, said engine control means setting the duty value to 100% in an initial setting operation.

24. The unit according to claim 17, wherein said resetting means includes:
first resetting means for resetting the control variable, which is corrected by said control variable correcting means in a direction that will suppress knocking, to an initial value when it is sensed that the engine has made a transition from the cold state to the hot state;
timekeeping means for counting a predetermined period of time from the moment it is sensed that the engine has made a transition from the cold state to the hot state, the control for suppressing knocking being executed while the predetermined period of time is being counted; and
second resetting means for again resetting the control variable, which is corrected by said control variable correcting means in a direction that will suppress knocking, to the initial value at the moment the predetermined period of time is found to elapse by said timekeeping means.

* * * * *